No. 647,780. Patented Apr. 17, 1900.
W. W. WILSON.
FILTERING APPARATUS.
(Application filed Sept. 22, 1899.)
(No Model.) 2 Sheets—Sheet 1.
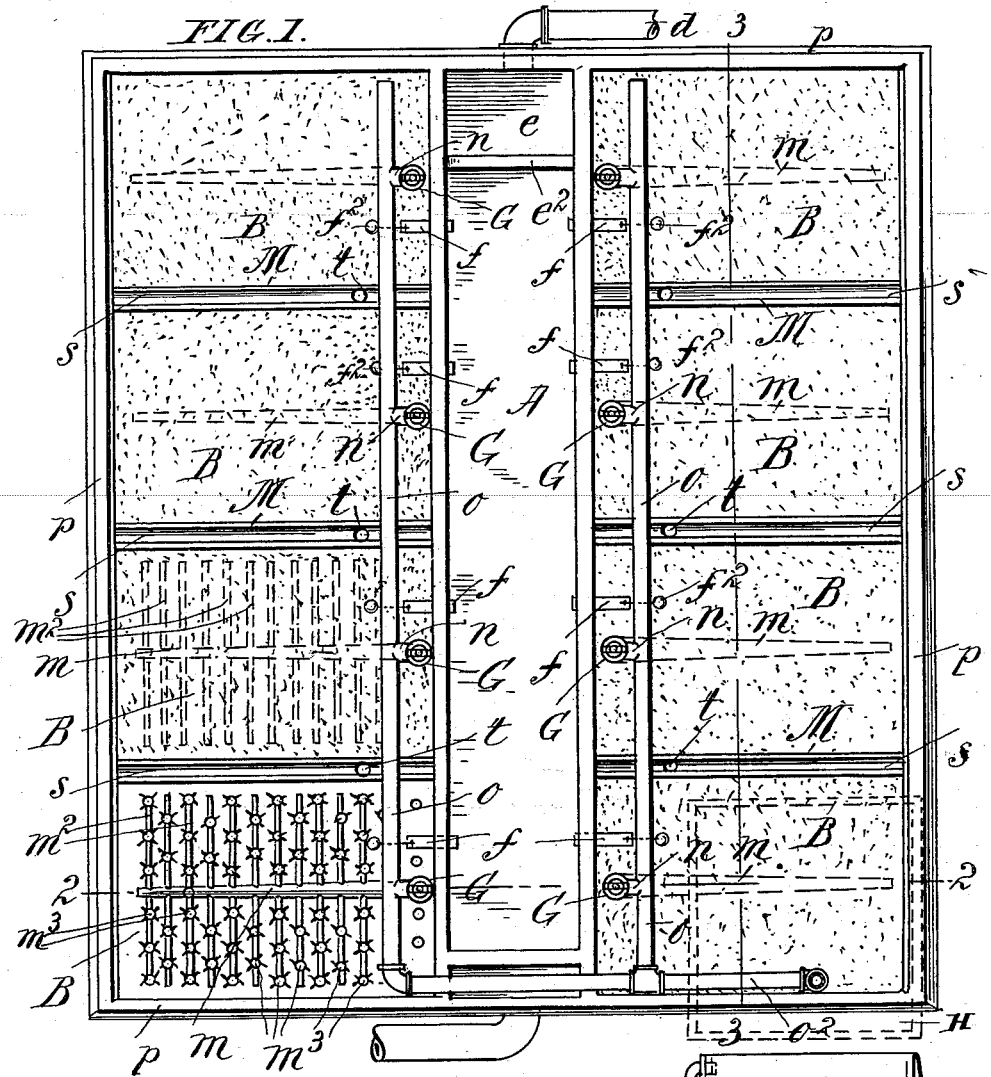
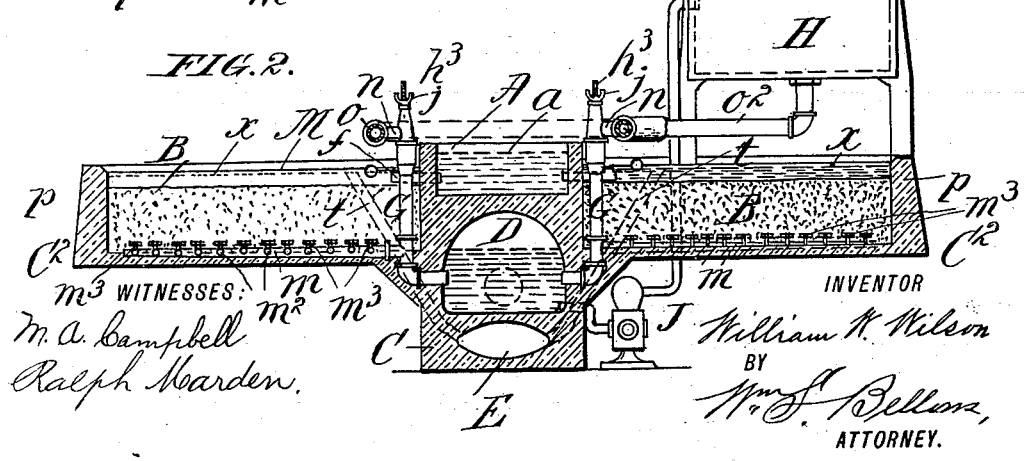
WITNESSES:
M. A. Campbell
Ralph Marden.
INVENTOR
William W. Wilson
BY
Wm. S. Bellows,
ATTORNEY.

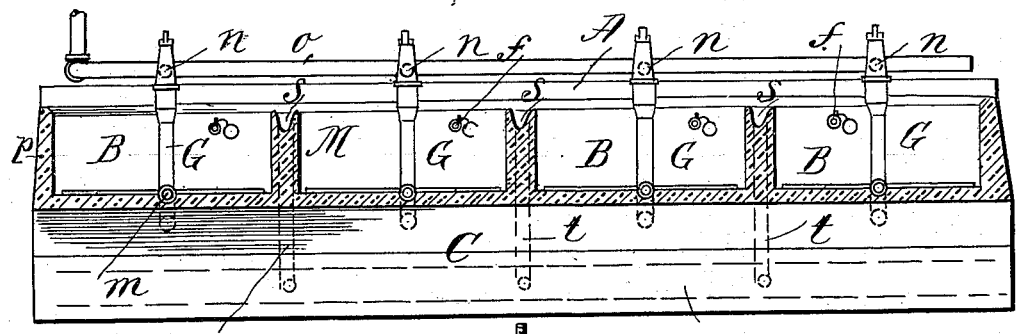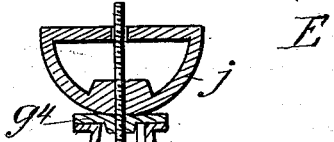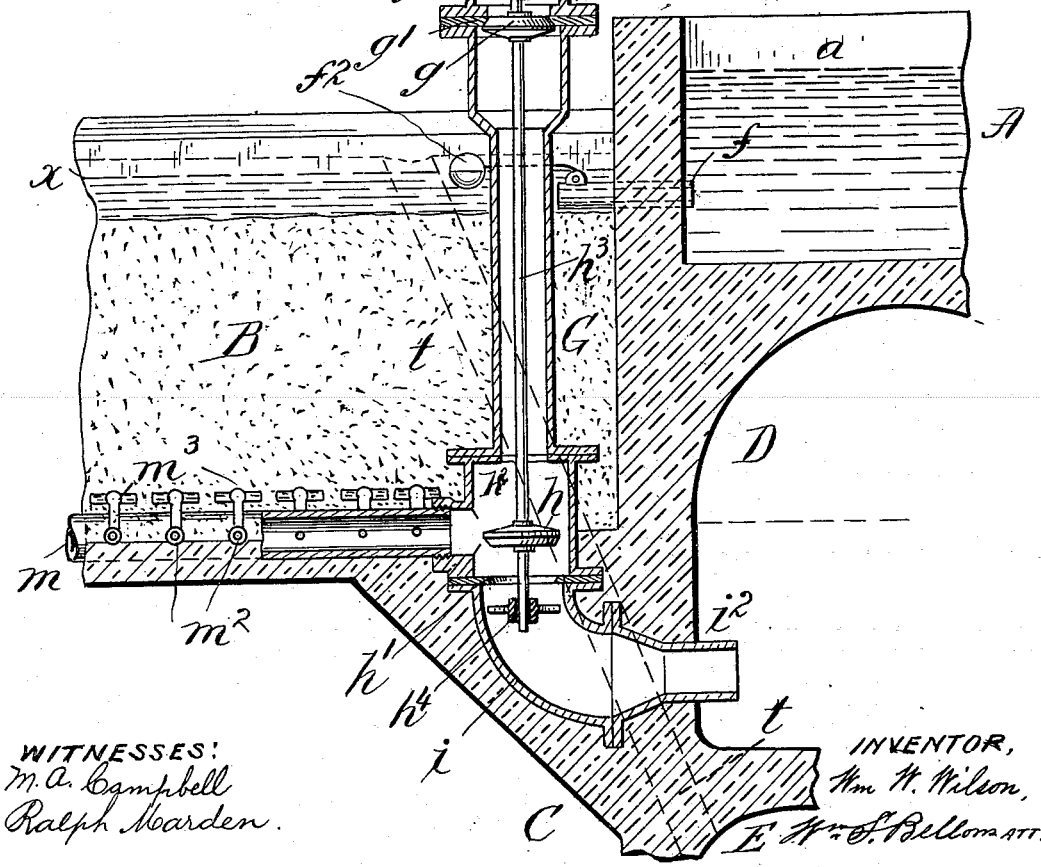

UNITED STATES PATENT OFFICE.

WILLIAM W. WILSON, OF HOLYOKE, MASSACHUSETTS.

FILTERING APPARATUS.

SPECIFICATION forming part of Letters Patent No. 647,780, dated April 17, 1900.

Application filed September 22, 1899. Serial No. 731,264. (No model.)

*To all whom it may concern:*

Be it known that I, WILLIAM W. WILSON, a citizen of the United States of America, and a resident of Holyoke, in the county of Hampden and State of Massachusetts, have invented certain new and useful Improvements in Filtering Apparatus, of which the following is a full, clear, and exact description.

This invention relates to improvements in a filtering apparatus or system more especially designed for the filtration of water in large quantities to be rendered available in the manufacture of paper or otherwise where a large quantity of water devoid of foreign matter is required.

One object of this invention is to provide a filtering apparatus which is of a comparatively simple and inexpensive construction and yet of the highest efficiency in its water-purifying action; and another object of the invention is to produce, in the filtering apparatus, improved arrangements for the washing out or cleansing of the material from which the filtering-beds are composed, which arrangements are comprised as a portion of the direct filtering means.

The invention consists in the filtering apparatus combining therein constructions and arrangements all substantially as will hereinafter be fully described, and set forth in the claims.

My improved filtering apparatus is illustrated in the accompanying drawings, in which—

Figure 1 is a plan view thereof, the location of an elevated tank comprised in the apparatus being indicated by dotted lines. Fig. 2 is a vertical transverse section of the filtering apparatus as taken on the line 2 2, Fig. 1, the elevated tank located at about the plane of section being shown in elevation. Fig. 3 is a vertical section as taken on the line 3 3, Fig. 1. Fig. 4 is a vertical sectional view, on a larger scale, provided for the purpose of showing more clearly certain portions of the apparatus.

In the drawings, A represents a long reservoir or canal arranged in common to and alongside of the several filtering-beds B B. As shown, there are series of the filtering-beds B, arranged at the opposite sides of the canal A, the water-level $a$ in the canal being above the water-level over the filtering-beds, which latter water-level is indicated at $x$ in Fig. 2. The filtering-beds are comprised in vats or tanks, the bottoms of which are considerably below the bottom of the canal A, and, as more plainly illustrated in Fig. 2, the walls and bottoms of the canal and the filter-bed receptacles are comprised in the central body or structure C, of suitably-impervious plastic material, as hydraulic cement or a combination thereof with other materials, with the horizontal transverse extensions $C^2$, the said central body having constructed therein below the canal A the longitudinally-extending receiver D, below which, also constructed in the said part C of the apparatus, is the receptacle, sewer, or conduit E for the wash-water or waste. The top of the receiver D (shown as extending above the bottom of the filter-bed receptacles and the bottom of the receiver) is essentially considerably below such bottom.

$d$ represents an inlet or supply pipe for conveying water ultimately to the canal A either by being first entered into the well $e$ at the end of the filter, which well at its upper portion overflows the somewhat-depressed end wall of the canal thereinto, or the supply-pipe may lead directly into the canal. The opposite side walls of the canal, which separate the latter from the inner portions of the filter-bed tanks, have the conduits $ff$ leading from the canal respectively for delivery into said tanks, these conduits being provided with ball-cocks or float-valves, the floats and lever-arms of which are indicated at $f^2$, whereby a uniform water-level lower than the level of the supplying-canal may be maintained over all of the filter-bed.

Provided in each filter-tank is an upright pipe or hydrant G, the internal construction of which is substantially illustrated in the sectional view, Fig. 4. This upright pipe or hydrant comprises or has connected thereto the chambered section $g$ at its upper portion, next below which is the valve-seat $g'$, at which the valve $g$ is provided and which when closed shuts off communication of the passage of liquid entered into the upper section downwardly into and through the upright pipe. The hydrant has at its lower portion, adjacent the bottom of the filter-tank, the chambered section $h^2$, in the lower portion of which is the valve-seat $h'$ and to close upon which the valve $h$ is provided, said valve $h$ being provided upon the same rod or valve-stem $h^3$ as the valve $g$. The valve-stem is guided in part through the spider $h^4$ in the elbow-coupling $i$, which is secured to the lower end of the casing-section $h^2$, and at its upper extremity it is guided through the apertured top cap $g^4$ of the casing-section $g^2$. The upper extremity of the valve-stem, which protrudes upwardly above the top of the hydrant, receives thereupon the hand-nut $j$, the turning of which in the proper direction insures at once the closing of the valve $g$ and the upwardly-opening movement of the valve $h$ above and away from its seat, while the turning of the nut in the reverse direction permits or insures the lowering of the valve-stem and the valve thereon, whereby the upper one may be opened and the lower one closed. The pipe-section $i^2$, coupled at the lower end of the hydrant, leads into the receiving-receptacle D.

$m$ represents a collector-trunk tube which by its one end is connected into the casing or coupling-section $h^2$ near the lower end of the hydrant, the same being disposed upon or in part embedded within the composition which forms the bottom of the filter-tank, and this horizontal collector-trunk $m$ is provided with a plurality of collector branch tubes $m^2$, each of which has a multiplicity of upstanding collectors $m^3$, which latter, comprising sand-valves, may be of any suitable or approved construction, that description of collector described and claimed in my patent of May 24, 1898, No. 604,573, being susceptible of advantageous use in this filtering apparatus or system.

The filter-tanks have therein a body of sufficiently-deep filtering material or combinations of materials, usually of a granular character, and not necessary to herein describe, the tanks being filled with this material from the bottom part way up to the top of each, as required, leaving a space thereabove for the water to be filtered received from the canal.

A pipe-section $n$ enters the upper portion of each hydrant G above the valve $g$ therein, the several sections for the respective hydrants in the series of filter-beds at one side of the canal having connection with the longitudinally-ranging pipe $o$, which pipe has by conduit $o^2$ connection with the elevated receptacle H.

J represents a pump connected with the receiving chamber or receptacle D for filtered water and delivering the same into the tank H above the filter-bed, which tank may be the reservoir for supplying the mill or other establishment for which the apparatus is provided and which also provides a clean supply of water for washing out the filter-beds, as hereinafter explained.

The filter-beds are divided or separated the one from the other by the partition-walls M, the tops of which are below the outer edge walls $p$ of all the filter-beds. These partitions M at their tops are channeled or of trough form, as shown at $s$, to receive the wash-water overflowing from above the beds thereinto and by the conduits $t$ conveying the same downwardly into the sewer E.

The operation of the apparatus for filtering is as follows: The lower valve $h$ in each hydrant being raised and opened and the upper valve $g$ being raised to its closed position and a suitable supply of water to be filtered delivered into the common canal A, the water thence passes through the conduits $f$, having the ball-cocks, onto the filtering-beds, and filtering through the latter and becoming purified thereby is taken through the collectors and collector branch and collector trunk tubes into the lower portion of the hydrant, passing therefrom through the hydrant terminal section into the receiver D directly under the canal. After use of the filtering apparatus for such length of time that the beds become foul or laden with impurities the filter-beds may be most readily and effectively cleansed by closing the valve $h$ in each of the hydrants G and opening each of the valves $g$ and permitting the passage downwardly through all of the hydrants of a sufficient quantity of washing-water under a proper head or pressure, the same being distributed through and issuing from all of the multiplicity of collectors and being forced upwardly through the material composing the filter-beds and overflowing into the channels $s$ in the partitions M, carrying therewith the impurities through the conduits $t$ $t$ into the sewer E under both the canal and the filtered-water-receiving chamber.

Having thus described my invention, what I claim, and desire to secure by Letters Patent, is—

1. In a filtering apparatus, a structure comprising a supply-canal, and thereunder a filtered-water-receiving chamber, several filtering-receptacles arranged somewhat lower than the supply-canal which is in common thereto, and from which they are fed, and a collecting-conduit, conveying the filtered water from each of the several filtering-receptacles into said receiving-chamber, substantially as described.

2. In a filtering apparatus, several filtering-tanks, a supply-canal higher than and common to said tanks, and conduits for feeding the tanks from the canal, a receiver below and common to the several tanks, collecting-conduits for conveying the filtered water from the tanks to the receiver, a common waste sewer or receptacle also below the tanks, means for carrying an upward current through the filtering material to overflow the filter-tanks, troughs in the partitions between the tanks into which the wash-water overflows, and conduits leading from said troughs to said sewer.

3. Several tanks having filtering material therein, and having separating-partitions which are formed at their tops with troughs, and a structure alongside and in common to the several filter-tanks which comprises the canal higher than the filtering-tanks, the receiving-chamber thereunder, lower than the filtering-tanks, and therebelow the waste-receptacle, conduits leading from the canal to the filter-tanks, collector-conduits for conveying the filtered water received from the tanks to said receiving-chamber, and conduits leading from the partition-troughs to the waste-sewer.

4. In combination, a filtering-bed, an upright pipe or hydrant therein, a chamber or receptacle for filtered water below the filter-beds and into which a continuation of said hydrant leads, a collector-tube having a connection with a lower portion of the hydrant, and a valve in the latter between the junction therewith of the collector-tube and its lower delivery extremity, a conduit for wash-water leading into an upper portion of the hydrant, and means for opening and closing the aforesaid valve, substantially as and for the purposes set forth.

5. In combination, a filtering-bed, an upright pipe or hydrant therein, a chamber or receptacle for filtered water below the filter-beds and into which a continuation of said hydrant leads, a collector-tube having a connection with a lower portion of the hydrant, and a valve in the latter between the junction therewith of the collector-tube and its lower delivery extremity, a conduit for wash-water leading into an upper portion of the hydrant, a valve in an upper part of the hydrant, below the connection therewith of said wash-water conduit, carried on the same stem as the first-named valve and arranged the one to be closed when the other is opened, and vice versa, and means for operating said valve-stem.

6. In combination, several filtering-beds, with separating-partitions with trough-tops, an upright pipe or hydrant in each bed, a chamber or receptacle for filtered water below the filter-beds and into which a continuation of each of said hydrants leads, the sewer E downwardly leading to which from said partition top troughs are the conduits $t\,t$, collector-tubes having connection with the lower portion of said hydrants, and a valve in each of the latter between the junction therewith of the collector-tube and its lower delivery extremity, a conduit for wash-water leading into the upper portions of the hydrants, and means for opening and closing the aforesaid valves, substantially as and for the purposes set forth.

7. In combination, several filtering-beds, with separating-partitions with trough-tops, an upright pipe or hydrant in each bed, the canal A, a chamber or receptacle D for filtered water thereunder and into which a continuation of each of said hydrants leads, the sewer E below receptacle D downwardly leading to which from said partition top troughs are the conduits $t\,t$, collector-tubes within the filter-beds, having connection with the lower portion of said hydrants, and a valve in each of the latter, between the junction therewith of the collector-tube and its lower delivery extremity, a tank located above the filtering-beds, a pump for forcing water from the receptacle D thereinto, a conduit running from said tank having branches leading into the upper portions of the hydrants, a valve in each hydrant adjacent the said branch which enters same, and means for opening the one and closing the other of said valves simultaneously, substantially as and for the purposes set forth.

Signed by me at Springfield, Massachusetts, this 18th day of September, 1899.

WILLIAM W. WILSON.

Witnesses:
WM. S. BELLOWS,
M. A. CAMPBELL.